United States Patent [19]
De Filippo

[11] Patent Number: 5,700,057
[45] Date of Patent: Dec. 23, 1997

[54] HEADREST FOR MOTOR VEHICLE SEATS AND A METHOD FOR ITS MANUFACTURING

[75] Inventor: Emilio De Filippo, Bruzolo, Italy

[73] Assignee: Gestind-M.B. "Manifattura di Brusolo" S.p.A., Brusolo, Italy

[21] Appl. No.: 763,106

[22] Filed: Dec. 10, 1996

[30] Foreign Application Priority Data

Jul. 16, 1996 [IT] Italy .................. TO96A0607

[51] Int. Cl.$^6$ .................................................. A47C 7/36
[52] U.S. Cl. ........................................ 297/408; 297/DIG. 2
[58] Field of Search ............................. 297/391, 408, 297/410, DIG. 1, DIG. 2, 451.13, 452.2; 264/512, 516

[56] References Cited

U.S. PATENT DOCUMENTS

| 3,476,496 | 11/1969 | Golden | 297/DIG. 2 X |
|---|---|---|---|
| 4,190,291 | 2/1980 | Korger | 297/408 |
| 4,673,214 | 6/1987 | Meiller | 297/408 |
| 4,738,809 | 4/1988 | Storch | 297/410 X |
| 4,779,929 | 10/1988 | Kuchemann | 297/408 |
| 4,840,428 | 6/1989 | Kobayashi et al. | 297/408 |
| 4,844,544 | 7/1989 | Ochiai | 297/408 |
| 4,861,107 | 8/1989 | Vidwans et al. | 297/408 |
| 5,165,754 | 11/1992 | Louys | 297/DIG. 2 X |
| 5,199,765 | 4/1993 | Garmendia et al. | 297/410 X |
| 5,257,853 | 11/1993 | Elton et al. | 297/DIG. 2 X |
| 5,261,726 | 11/1993 | Yanagishita | 297/408 |
| 5,316,372 | 5/1994 | Amner | 297/408 |
| 5,405,190 | 4/1995 | Jeffcoat et al. | 297/391 |

*Primary Examiner*—Milton Nelson, Jr.
*Attorney, Agent, or Firm*—Sughrue, Mion, Zinn, Macpeak & Seas, PLLC

[57] ABSTRACT

A headrest for motor vehicle seats comprising a resilient body incorporating a molded plastic material supporting framework connected in a frictionally rotatable way to a bearing structure. The supporting framework has an integral tubular base directly overmolded on the transverse member of the bearing structure, so as to perform a mutual rotatable coupling with interference without any need of auxiliary friction members.

10 Claims, 2 Drawing Sheets

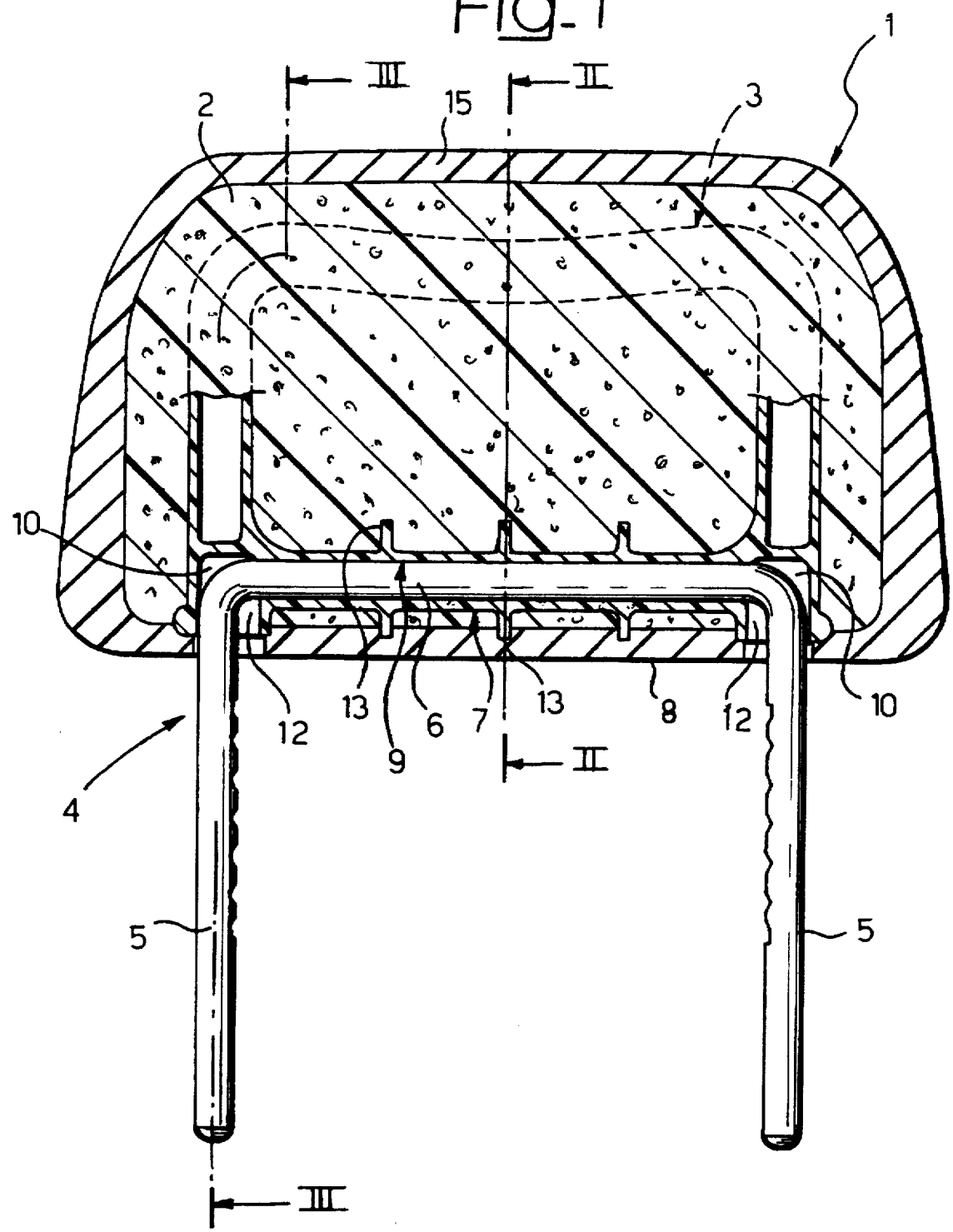

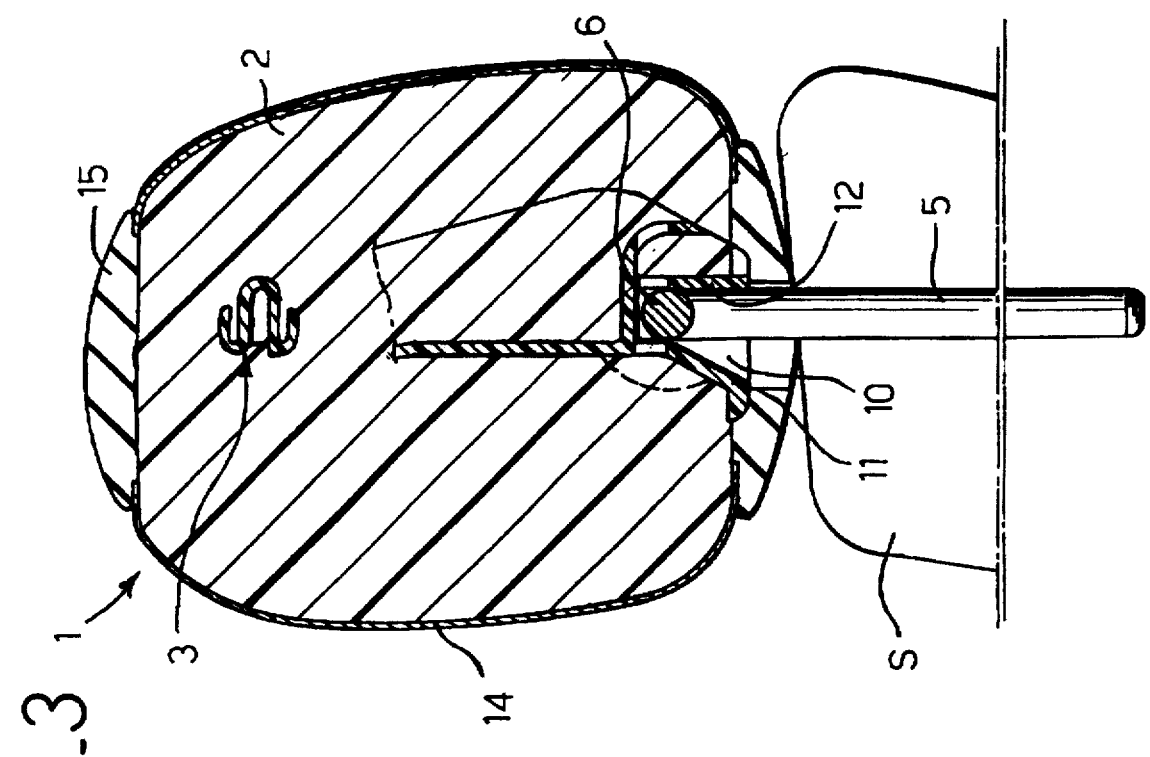
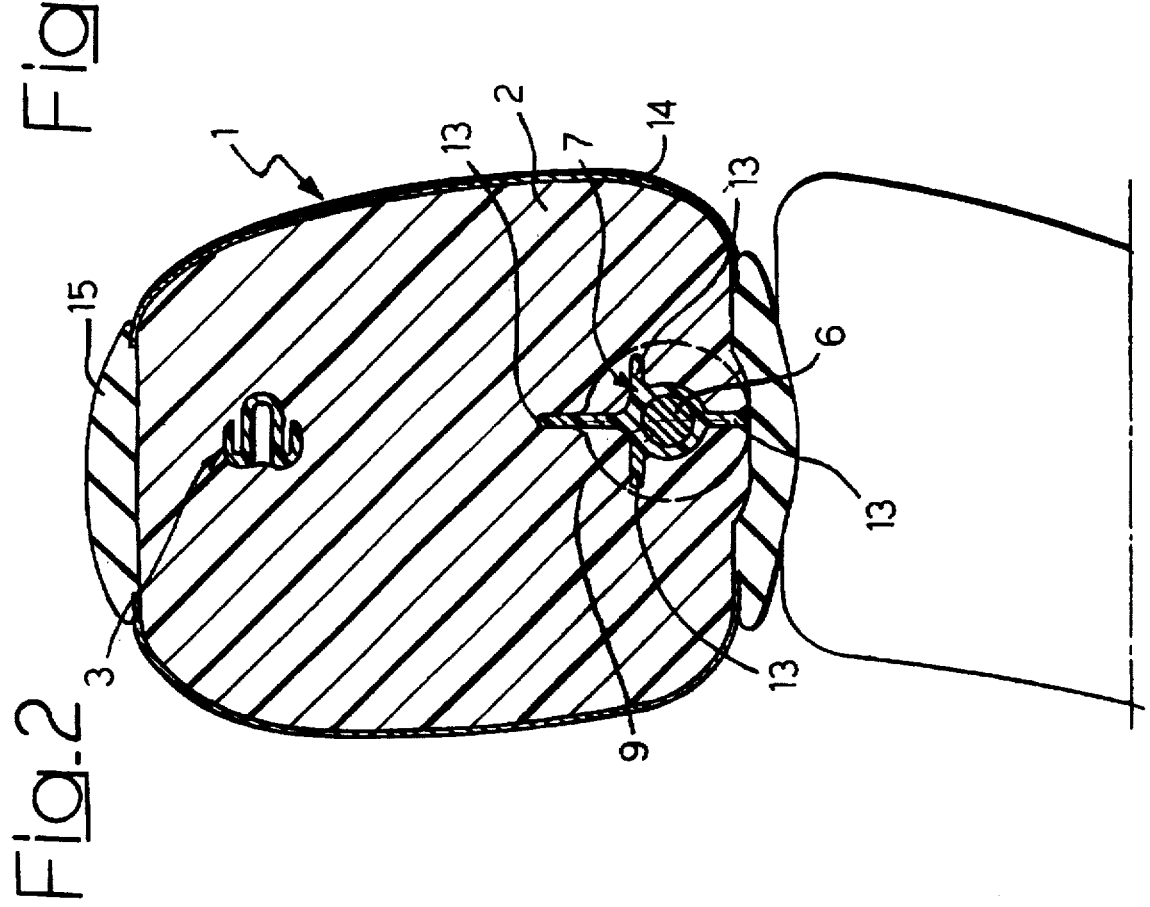

HEADREST FOR MOTOR VEHICLE SEATS AND A METHOD FOR ITS MANUFACTURING

BACKGROUND OF THE INVENTION

The present invention relates to headrests for motor vehicle seats, comprising a resilient body incorporating a moulded plastic material supporting framework, and a bearing structure including a pair of rods to be connected to a seat backrest frame and a cylindrical transverse member rigidly interconnecting said rods, and wherein frictionally rotatable connecting means are provided between said transverse member and said bearing structure to selectively adjust inclination of the resilient body relative to said rods.

Traditionally, in the known headrests of the above-referenced type the transverse member of the bearing structure is connected to corresponding articulation parts of the bearing structure in a freely rotatable fashion, and a braking member, formed by a leaf spring fixed by means of a screw or the like to supporting framework, is provided for the mutual frictioned connection thereof.

This arrangement is relatively complicated and expensive from the manufacturing point of view, particularly in relation to the relatively low final sale price of the headrest, since it requires several steps during the manufacturing cycle. Actually, after in-mould forming of the supporting framework, it is necessary to carry out connection of the bearing structure by mounting the leaf spring, and then proceed to forming the resilient body normally by over-moulding same on the supporting framework.

SUMMARY OF THE INVENTION

The object of the present invention is to overcome the above drawback, and to provide a headrest for motor vehicle seats of the type set forth in the above which is formed by an essential number of components and can be produced in a more simple and cheap way, with a simplified method.

According to the invention, this object is achieved essentially by virtue of the fact that the supporting framework has an integral tubular base with a cylindrical cavity which is directly overmoulded onto said transverse member of the bearing structure, upon forming said supporting framework, so as to provide a mutual interference rotatable coupling between said tubular base and said transverse member, defining said frictionally rotatable connecting means.

Due to this idea of solution the need of any additional resilient device for the frictionally rotatable connection between the supporting framework and the bearing structure is avoided, which, further to reduce the number of the headrest components, leads to a remarkable simplification of the manufacturing method. Additionally the weight of the headrest as a whole is also reduced.

The invention is also directed to a method for the manufacturing of the headrest of the above-referenced type, characterized in that it comprises the step of overmoulding said supporting framework on said transverse member, so as to form an integral tubular base of said supporting framework, housing said transverse member and performing therewith an interference rotatable coupling. The resilient body is then in turn overmoulded on said supporting framework already previously overmoulded on said transverse member of the bearing structure.

BRIEF DESCRIPTION OF THE DRAWINGS

The invention will now be disclosed in detail with reference to the accompanying drawings, purely provided by way of non-limiting example, in which:

FIG. 1 is a longitudinally and vertically diagrammatic sectioned view of a headrest for motor vehicle seats according to the invention, FIG. 2 is a vertically cross-sectioned view along line II—II of FIG. 1, and FIG. 3 is a vertically cross-sectioned view along line III—III of FIG. 1.

DETAILED DESCRIPTION OF THE INVENTION

Referring to the drawings, reference numeral 1 generally designates a headrest for motor vehicle seats, comprising a resilient body or pillow 2 normally made of foamed plastic material, within which a supporting framework 3 made of moulded plastic material is incorporated, which is swingably connected, such as clarified here below, to a bearing structure 4.

The bearing structure 4, which is normally made of metal, has a reversed-U configuration, defined by a pair of substantially vertical support rods 5, which may have a tubular design and are intended to be connected inferiorly in a conventional way, thus not shown in the drawings, to the frame of the backrest S of a motor vehicle seat. The rods 5 are superiorly bent so as to form in one piece a substantially horizontal joining transverse or yoke member 6, having a cylindrical shape with circular cross-section.

The transverse member 6 extends through a continuous tubular housing 7 provided horizontally in proximity of the base 8 of the pillow 2, and which is integrally formed with the supporting framework 3 upon moulding thereof, such as disclosed here below. The tubular housing 7 has an inner cylindrical cavity 9 whose diameter is substantially corresponding to that of the transverse member 6, so as to provide a mutual frictionally rotatable coupling by means of which the inclination of the supporting framework 3, and thus of the pillow 2, can be selectively adjusted relative to the support rods 5 of the bearing structure 4.

Above the tubular housing 7, the supporting framework 3 has a generally frame-like configuration. In correspondence of the opposite ends of the tubular housing 7, the supporting framework 3 is formed with a pair of lateral cavities 10 housing the top ends of the support rods 5 and provided with respective front and rear surfaces 11 and 12 to limit the angular displacement of the pillow 2 relative to the bearing structure 4, for instance within a range of 30°.

Further, on the outer wall of the tubular housing 7, the supporting framework 3 is formed with outer stiffening ribs and projections 13.

The pillow 2, which as explained is normally made of foamed plastic material, may be covered by a fabric lining 14 secured thereto for instance by moulding over the pillow 2 an annular element 15, also made of a foamed plastic material, which is conveniently softer than that forming the pillow 2.

The method for the manufacturing of the headrest 1 includes the following steps.

Firstly the supporting framework 3 is formed within a mould into which the transverse member 6 of the bearing structure 4 is inserted (in a way which is within the skill of the practitioner). Thus the tubular housing 7 is directly overmoulded onto the transverse member 6, so as to perform therewith the interference rotatable coupling providing the frictioned connection allowing, in use of the headrest, adjustment of the inclination of the pillow 2 relative to the bearing structure 4.

Further, the supporting framework 3 thus overmoulded on the transverse member 6 is inserted into the foaming mould within which the pillow 2 is overmoulded on the supporting framework 3. Lastly, the pillow 2—supporting framework 3—bearing structure 4 assembly is inserted, after simply laying the fabric lining 14 over the corresponding areas of the pillow 2, into the foaming mould in which the annular element 15 is then overmoulded. Following this overmoulding, the fabric lining is thus perimetrally secured to the annular element 15, and thus fixed to the pillow 2 without any need of bonding.

It will be apparent from the above that the headrest according to the invention is constituted by an essential number of components which, particularly with reference to the frictioned rotatable connection between the pillow 2 and the bearing structure 4, avoid any auxiliary resilient members between the supporting structure 3 and the transverse member 6. Accordingly the industrial manufacturing cycle of the headrest can be simplified and remarkably less expensive.

Naturally the details of construction and the embodiments may be widely varied with respect to what has been disclosed and illustrated, without thereby departing from the scope of the present invention, such as defined in the appended claims.

What is claimed is:

1. A headrest for a motor vehicle seat having a backrest, comprising a resilient body incorporating a moulded plastic material supporting framework, and a bearing structure including a pair of rods to be connected to said seat backrest and a cylindrical transverse member rigidly interconnecting said rods, wherein frictionally rotatable connecting means are provided between said transverse member and said supporting framework to selectively adjust inclination of said resilient body relative to said rods, said supporting framework having an integral tubular base with a cylindrical cavity which is directly overmoulded onto said transverse member of said bearing structure, upon forming said supporting framework, so as to provide mutual interference rotatable coupling between said tubular base and said transverse member, defining said frictionally rotatable connecting means.

2. Headrest according to claim 1, wherein said tubular base continuously extends substantially over the entire length of said transverse member.

3. Headrest according to claim 1, wherein tubular base has opposite ends, said rods of said bearing structure have respective top ends, and said supporting framework is formed, adjacent said opposite ends of said tubular base, with a pair of housings for said top ends of said rods, said housings having respective stop surfaces to limit angular displacement of said resilient body relative to said rods.

4. Headrest according to claim 1, wherein said tubular base of the supporting framework has outer stiffening ribs.

5. A method for manufacturing of a headrest for a motor vehicle seat having a backrest, comprising a resilient body incorporating a moulded plastic material supporting framework, and a bearing structure including a pair of rods to be connected to said seat backrest and a cylindrical transverse member rigidly interconnecting said rods, and frictionally rotatable connecting means between said transverse member and said supporting framework to selectively adjust inclination of said resilient body relative to said rods, said method comprising the steps of overmoulding said supporting framework on said transverse member so as to form an integral tubular base of said supporting framework which encloses said transverse member and performs therewith an interference rotatable coupling defining said frictionally rotatable connecting means.

6. Method according to claim 5, wherein said tubular base is formed continuously substantially along the entire length of said transverse member.

7. Method according to claim 5, wherein said tubular base has opposite ends and said rods of said bearing structure have respective top ends, and wherein said supporting framework is formed, adjacent the opposite ends of said tubular base, with a pair of housings for said top ends of said rods, said housings being formed with respective integral stop surfaces to limit angular displacement of said resilient body relative to said rods.

8. Method according to claim 5, wherein said tubular base of said supporting framework is formed with outer stiffening ribs.

9. Method according to claim 5, further comprising the step of overmoulding said resilient body on said supporting framework with said bearing structure.

10. Method according to claim 9, further comprising the step of overmoulding a foamed plastic material element on said resilient body simultaneously securing a flexible lining sheet onto said resilient body.

* * * * *